(12) United States Patent
Roehm

(10) Patent No.: US 7,508,679 B2
(45) Date of Patent: Mar. 24, 2009

(54) ELECTRICAL TOOL

(75) Inventor: Heiko Roehm, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 27 days.

(21) Appl. No.: 11/143,899

(22) Filed: Jun. 2, 2005

(65) Prior Publication Data

US 2005/0270754 A1    Dec. 8, 2005

(30) Foreign Application Priority Data

Jun. 5, 2004    (DE) .................. 10 2004 027 643

(51) Int. Cl.
*H05K 5/00* (2006.01)
(52) U.S. Cl. .................. 361/755; 361/790; 361/800
(58) Field of Classification Search .................. 361/752, 361/790

See application file for complete search history.

(56) References Cited

U.S. PATENT DOCUMENTS

| 4,759,240 A | 7/1988 | Lin |
| 4,912,349 A * | 3/1990 | Chang .................. 310/50 |
| 4,976,173 A * | 12/1990 | Yang .................. 81/54 |
| 5,122,427 A * | 6/1992 | Flowers et al. .................. 429/97 |
| 5,372,420 A | 12/1994 | Van Deursen et al. |
| 5,947,912 A * | 9/1999 | Montagnino .................. 601/142 |
| 5,950,268 A | 9/1999 | Muephy et al. |
| 6,039,126 A * | 3/2000 | Hsieh .................. 173/216 |
| 6,467,556 B2 * | 10/2002 | Alsruhe .................. 173/217 |
| 2002/0011344 A1 | 1/2002 | Alsruhe |

FOREIGN PATENT DOCUMENTS

EP    1 075 906 B1    6/2003

* cited by examiner

*Primary Examiner*—Hung S Bui
(74) *Attorney, Agent, or Firm*—Michael J. Striker

(57) ABSTRACT

An electrical tool with an adjustable housing geometry has a motor part, a handle part situated so that it is displaceable relative to the motor part via a connection, and a power supply block that is replaceable using a detachable connection, the power supply block being configured as the handle part, and the connection simultaneously forming the detachable connection.

20 Claims, 2 Drawing Sheets

ELECTRICAL TOOL

CROSS-REFERENCE

The invention described and claimed hereinbelow is also described in DE 10 2004 027 643.9, filed Jun. 5, 2004. This German Patent Application, whose subject matter is incorporated here by reference, provides the basis for a claim of priority of invention under 35 U.S.C. 119(a)-(d).

BACKGROUND OF THE INVENTION

The present invention relates to an electrical tool and also to a tool system.

Electrical tools are used in highly diverse applications. They are widespread as manually-guided electrical tools in highly diverse configurations depending on the intended purpose and site of application. Manually-guided electrical tools are designed either as mains-powered tools or as battery and/or rechargeable-powered tools. Electrical tools powered by rechargeables exist in configurations with permanently installed rechargeables and/or rechargeable packs, by way of which a compact design can be realized that is also extremely stable due to the fact that the housing design is typically closed. Electrical tools powered by rechargeables also exist in configurations with replaceable rechargeable packs.

Electrical tools with permanently installed rechargeables have the advantage that they are compact in size, since the cells can be placed in the housing in an optimum manner. The disadvantage of built-in cells, however, is that, when the rechargeable runs out, the operator must interrupt his work with the electrical tool for a long period of time to recharge the battery. Replacing damaged rechargeable cells is usually not economical and signals the end of the product service life. Rechargeables that are replaceable have the advantage, however, that a "dead" rechargeable pack can be replaced with a charged replacement rechargeable pack, thereby ensuring that work is interrupted only briefly. A defective rechargeable pack can be replaced very easily with another rechargeable pack.

The disadvantage of electrical tools with replaceable rechargeable packs is their large size and typically heavy weight resulting from the detachable connection that is required. The detachable connection between the rechargeable pack and the electrical tool furthermore results in additional housing volume, since rechargeable packs are inserted—either entirely or partially—into corresponding recesses in the housing of the electrical tool. This results in a double-wall construction, consisting of the wall of the housing of the electrical tool and the wall of the rechargeable pack to be inserted.

Electrical tools with replaceable rechargeable packs in particular exist in pistol shapes, for example, with which the rechargeable pack is attached as a separate component via a receptacle in the housing of the electrical tool on the lower end of the handle. The weight distribution and structural size are disadvantages in this case. Furthermore, electrical tools with rechargeable packs also exist as devices having a rod shape, in the case of which the replaceable rechargeable pack is housed in a housing extension aligned with the central longitudinal axis of the housing, the extension being configured as a handle part. With a few devices having a rod-shaped design, it is possible to vary the housing geometry using a joint between the motor part and the handle part.

The disadvantage of these rod-shaped configurations is the typically low rechargeable capacity, since the rod shape allows only relatively small rechargeable cells to be used, due to the limited installation space, in particular when replaceable rechargeable packs are used. The disadvantage of the joint-type design is its greater technical complexity, especially since it does not permit the realization of a housing geometry that is fixed reliably in position when force is applied.

SUMMARY OF THE INVENTION

Accordingly, it is an object of the present invention to provide an electrical tool as well as a tool system, which eliminates the disadvantages of the prior art.

In keeping with these objects and with others which will become apparent hereinafter, one feature resides, briefly stated in an electrical tool with an adjustable housing geometry, comprising a motor part; a handle part situated so that it is displaceable relative to said motor part via a connection; and a power supply block that is replaceable using a detachable connection, said power supply block being configured as said handle part, and said connection simultaneously forming said detachable connection.

The present invention has the advantage that the adjustable housing geometry is realized using a motor part and a handle part situated such that it is displaceable relative to said motor part via a connection, and power is supplied by a power supply block that is replaceable using a detachable connection, whereby the power supply block is configured as a handle part and the connection between motor part and handle part serves simultaneously as the detachable connection between the power supply block and the motor part. As a result, the power supply block is not housed in the handle part as a separate component, nor is it connected with the handle part, i.e., inserted therein. Instead, it is configured as the handle itself.

Due to a single-walled design according to the present invention, the double-wall configuration in particular can be eliminated. Different housing geometries are not achieved using a pivoting joint or the like, but rather using a different connection of the motor part to the handle part, whereby this connection serves simultaneously as the detachable connection for the power supply block.

According to a further development of the present invention, the power supply block is designed as a rechargeable block. The handle part is therefore composed of a replaceable rechargeable pack, so that, when the voltage in the rechargeable drops off, the entire handle is removed from the motor part and recharged, and another handle part, which is a rechargeable block, is attached to the motor part. The housing of the handle part is also the housing of the replaceable rechargeable pack.

According to another further development of the present invention, the detachable connection is designed as a coupling, in particular as a bayonet coupling. With an embodiment of this type, the handle part can be connected to the motor part very quickly, whereby an unambiguous attachment and locking geometry—and, ultimately, an unambiguous housing geometry—can be predetermined by the configuration of the coupling. The configuration as a bayonet coupling also offers the advantage that a small or large angle of rotation for detaching or attaching the handle part from or to the motor part can be selected depending on the requirements, and a simple, fast and defined coupling connection is enabled.

According to a preferred further development of the present invention, it is provided that the adjustable housing geometry is at least a rod shape, an offset rod (that is, a shape that could not be referred to as cylindrical in the strictest sense of the word), or an L shape. An L shape is largely understood to refer to a pistol shape, i.e., a housing geometry with which the housing central longitudinal axes of the motor part and the handle part form an angle that is not 90°, and, in particular, an angle that is between 90° and nearly 120°. This allows the handle part to be attached to the motor part in a manner that ensures optimal handling and controllability of the electrical tool for the desired application.

According to a further preferred embodiment of the present invention, it is provided that a connection surface of the connection forms an angle of approximately 45° with the housing central longitudinal axes of the motor part and the handle part. This makes it very easily possible to create a rod shape and an L shape using the two parts of the electrical tool. In one final position of the connection, the two connection surfaces abut each other—due to their 45° angle—such that, when together, they form an angle of nearly 90° and therefore create an L-shaped housing geometry. In another final position of the connection, the two connection surfaces abut each other such that they form an extended, rod-shaped housing geometry. Based on the axis through the geometric center point of the two connection surfaces, an angle of 180° is formed between these two final positions. This angle can be considered as the angle around which a coupling—that functions as a connection—snaps into place, displaced relative to the first final position.

According to a further embodiment of the present invention, the housing central longitudinal axes in the case of an L-shaped housing geometry form an angle of up to 120°. This configuration allows a pistol-shaped L-form of the housing geometry to be realized, which enables particularly good handling and power transfer from the operator to the electrical tool.

According to another further development of the present invention, the housing central longitudinal axes of the motor part and the handle part extend toward each other, offset and in parallel. The result, therefore, is not a continuous rod shape. Instead, the rod shape has an offset and/or right-angle bend in the region of the connection, which makes the electrical tool particularly easy to hold and handle.

According to a further embodiment of the present invention, the housing central longitudinal axes of the motor part and the handle part in the rod-shaped geometry form an angle of up to 30°. Accordingly, the rod shape has a slight U-bend in the region of the connection. As a result, good handling and force transfer is also obtained with a rod-shaped housing geometry, which is an advantage in particular in an unaccessible working environment with limited working space.

According to another further development of the present invention, the connection surface is configured as a connection plane and/or in a connection plane toward which a housing geometry rotational axis extends at a 90° angle through the geometric center point of the connection. If the final positions of the two components of the electrical tool, i.e., the motor part and the handle part, are rotated around this rotational axis, in particular by approximately 180°, a transition from the rod shape to the L shape is achieved. The housing geometry rotational axis is preferably also the rotational axis of the coupling that enables the motor part to be connected to the handle part. Various housing geometries can be predefined via offset coupling, which can be achieved, e.g., via a suitable arrangement of the coupling elements, i.e., in particular of the snap-in stages for the particular final positions.

According to another further development of the present invention, the housing central longitudinal axes of the motor part and the handle part each intersect the housing geometry rotational axis, whereby one intersection point is located at a distance from the connection plane and in the region of the motor part, and the other intersection point is located at a distance from the connection plane and in the region of the handle part. By way of this geometric configuration, it is possible to realize a simple displacement of the central longitudinal axes of the motor part and the handle part when they are joined in a rod shape.

According to another embodiment of the present invention, the angle at which the housing central longitudinal axes of the motor part and the handle part intersect the particular connection surfaces are not identical. Accordingly, the connection surface of the motor part and the handle part can each have a different angle relative to the particular component. Connections having different angles are obtainable as a result.

The present invention further proposes a tool system for providing an electrical tool according to one or more of the aforementioned embodiments, in which a plurality of different motor parts and at least one handle part are provided, whereby one motor part and one handle part configured as a power supply block form a single functional unit. Depending on the application, the operator can therefore select the associated motor part that is suitable for the intended application for use with the same handle, which is configured as a power supply block. In addition to a motor part designed as a screwdriver, a motor part can also be used that provides, e.g., a saw with a circulating, rotary oscillating motion or an oscillating stroking motion, a grinder with eccentric motion or rotary oscillating motion, a drill or a suction and/or blowing device. The operator can therefore easily switch from a screw application to a sawing application, whereby only one handle is needed. Costs and space are saved in particular as a result, since a complete machine is not needed for every application, but rather an appropriate motor part and a general-use handle part.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
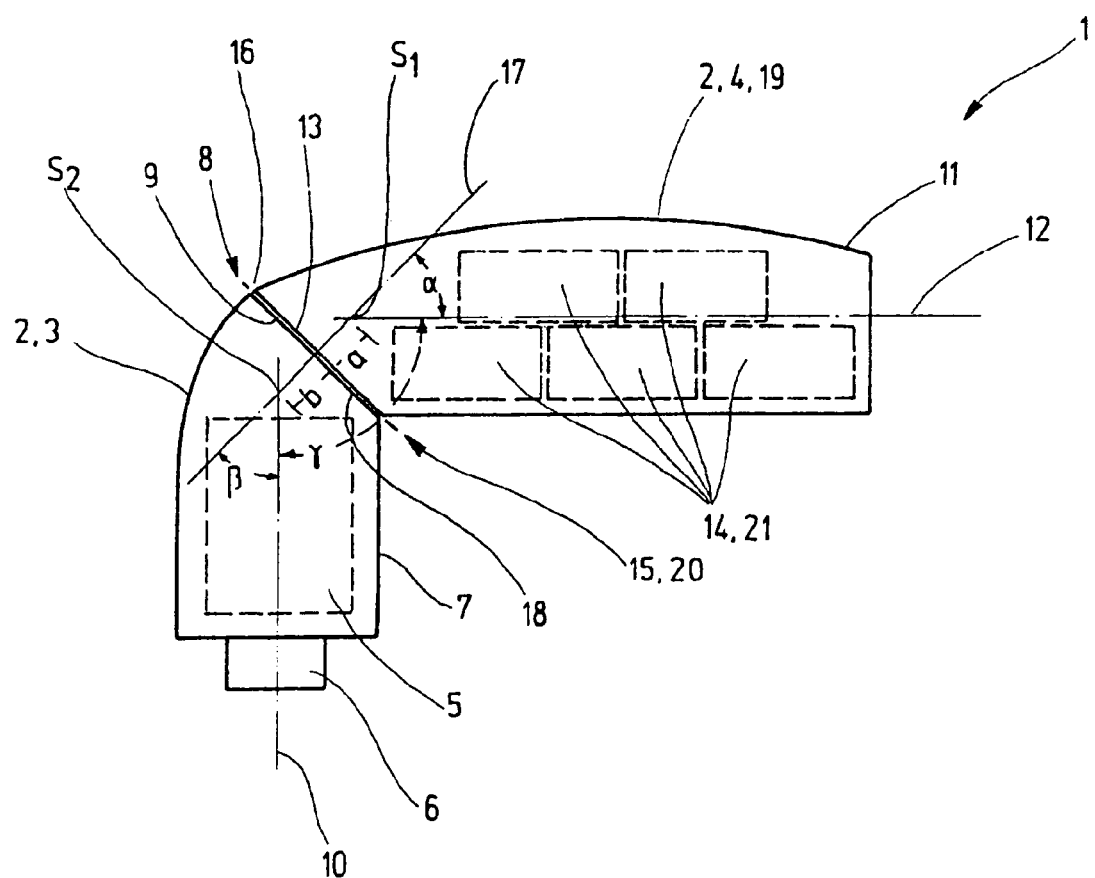
FIG. 1 shows an electrical tool with an L-shaped housing geometry.

FIG. 1 shows an electrical tool 1. It is composed of two components 2, namely a motor part 3 and a handle part 4. Motor part 3 includes an electric motor 5 and a force coupling member 6 designed to receive the tool, both of which are located inside a housing 7 or on housing 7 of motor part 3. A connection surface 9 is provided on side 8 of housing 7 diametrically opposed to force coupling member 6. Said connection surface 9 forms a 45° angle with a housing central longitudinal axis 10 and is therefore slanted relative to the longitudinal orientation of housing 7, and forms the termination of said housing 7.

Handle part 4 includes a housing 11. Its central longitudinal axis 12 forms a 45° angle with connection surface 13 facing motor part 3. Connection surface 13 is the termination of housing 11 of handle part 4 that faces motor part 3.

Rechargeable cells 14 are located inside housing 11 of handle part 4. Motor part 3 and handle part 4 are joined with each other via a connection 15 formed by connection surfaces 9 and 13. Due to the fact that housing central longitudinal axes 10, 12 of motor part 3 and handle part 4 form a 45° angle with connection surfaces 9, 13, an L-shaped housing geometry is created. The housing central longitudinal axes 10 and 12 of motor part 3 and handle part 4 therefore form an angle γ of 90°.

Connection surfaces 9, 13 lie in or are parallel to a connection plane 16, on which a housing geometry rotational axis 17 is perpendicularly located. Housing geometry rotational axis 17 passes through connection surfaces 9, 13 at their geometric midpoints. Housing central longitudinal axes 10, 12 both intersect housing geometry rotational axis 17 and form a 45° angle α and β, respectively, forming intersection points $S_1$ and $S_2$. Intersection point $S_1$ is located inside handle part 4 and at a distance a from connection plane 16. Intersection point $S_2$ is located inside motor part 3 and at a distance b from connection plane 16.

Connection 15 is designed as a detachable connection 20. This means that handle part 4 can be separated from motor part 3 at connection plane 16 and reattached thereto. Devices (not shown here) are provided for this purpose inside connection 15 (detachable connection 20) that enable a detachable, mechanical, non-positive connection between motor part 3 and handle part 4 and an electrical connection between rechargeable cells 14 located in handle part 4 and motor 5 located in motor part 3. Detachable connection 20 is configured preferably as a coupling 18, in particular as a bayonet coupling, thereby enabling decoupling of both components 2 from a given final position and, therefore, disconnection of motor part 3 and handle part 4 from each other at an angle of rotation, selected accordingly, around housing geometry rotational axis 17, and enabling easy coupling and, therefore, connection of motor part 3 and handle part 4 by rotating in the reverse direction.

By designing handle part 4 as a power supply block, in particular as a rechargeable block 21, handle part 4 not only enables handling in terms of holding the electrical tool and transferring force to it, but it also serves as the power supply. Due to the fact that handle part 4 can be separated from motor part 3 via detachable connection 20, when rechargeable cells 14 become fully discharged, handle part 4 can be replaced with another handle 4 with charged rechargeable cells 14. It is also possible to use the same handle 4 with another motor part 3 designed for other types of work, i.e., in particular one with a force coupling member 6 designed for other tools (e.g., a sawing device instead of a screwing or drilling device). Due to the fact that handle part 4 itself contains rechargeable cells 14, i.e., it is configured in entirety as a rechargeable block 21, the housing need not have a double-wall construction, as is the case, for example, when replaceable rechargeables or replaceable rechargeable blocks are inserted into a housing.

Figure 2:
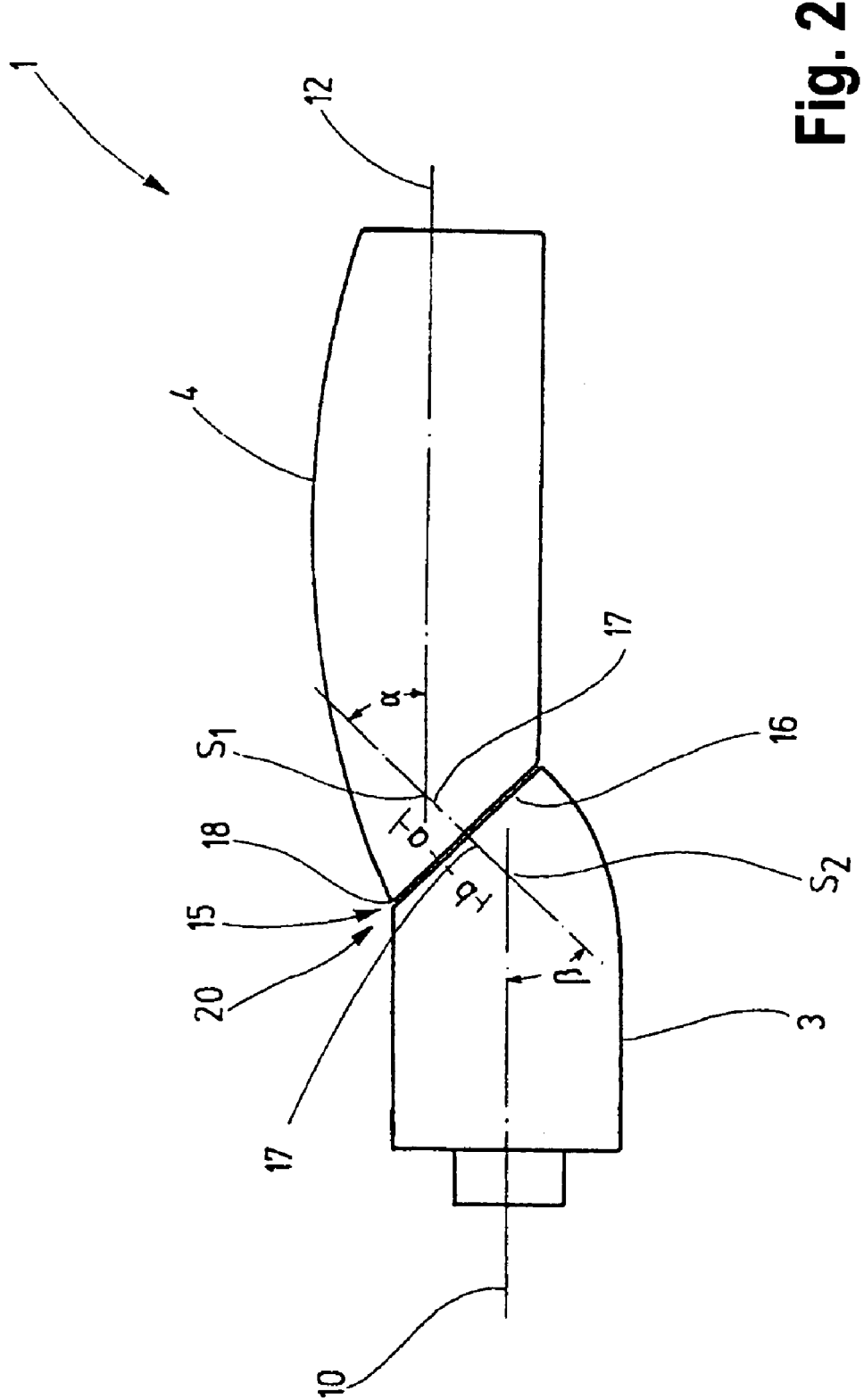
FIG. 2 shows an electrical tool with an offset, rod-shaped housing geometry.

FIG. 2 shows the same electrical tool 1 as in FIG. 1. In deviation from the depiction in FIG. 1, motor part 3 and handle part 4 are joined by connection 15 offset by 180° around housing geometry rotational axis 17, resulting in the offset rod shape of the housing geometry. In this case as well, housing central longitudinal axes 10, 12 of motor part 3 and handle 4 form 45° angles β and α, respectively, with housing geometry rotational axis 17, resulting again in intersection points $S_2$ and $S_1$. Intersection point $S_1$ is again located inside handle part 4 and at a distance a from connection plane 16, and intersection point $S_2$ is located inside motor part 3 and at a distance b from connection plane 16. In contrast to FIG. 1, in which housing central longitudinal axes 10, 12 form an angle of approximately 90°, housing central longitudinal axes 10, 12 extend in parallel with each other in FIG. 2. The parallel offset of the two housing central longitudinal axes 10, 12 results in the offset rod shape. Coupling 18 can be configured such that handle part 4 and motor part 3 can be positioned relative to each other in different angular stages via housing geometry rotational axis 17. This results in different housing geometries, from the offset rod shape shown in FIG. 2 to the L shape shown in FIG. 1.

It will be understood that each of the elements described above, or two or more together, may also find a useful application in other types of constructions differing from the types described above.

While the invention has been illustrated and described as embodied in an electrical tool and a tool system, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An electrical tool with an adjustable housing geometry, comprising:
   a motor part; and
   a handle part including a power supply block, wherein said motor part and said handle part establish a detachable connection, and each have a connection face on which is provided complementary connection means, said connection means being detachably engageable in order to releasably connect said motor and said handle parts in a manner which allows relative movement, and wherein said detachable connection has a connection plane which is intersected by a central longitudinal axis of a housing of said motor part and which is intersected by a central longitudinal axis of a housing of said handle part.

2. An electrical tool as defined in claim 1, wherein said power supply block is a rechargeable block.

3. An electrical tool as defined in claim 1, wherein said adjustable housing geometry is in one position, an offset rod shape geometry, and, in another position, an L shape geometry.

4. An electrical tool as defined in claim 1, wherein said motor part and said handle part have housings with central longitudinal axes each intersecting a rotational axes of the housing geometry, with one intersection point located at a distance from a plane of said connection and in a region of said motor part, and another intersection point located at a distance from the connection plane and in a region of said handle part.

5. An electrical tool with an adjustable housing geometry, comprising:
   a motor part; and
   a handle part including a power supply block, wherein said motor part and said handle part each have a connection face on which is provided complementary connection means, said connection means being detachably engageable in order to releasably connect said motor and said handle parts in a manner which allows relative movement therebetween, wherein the housing geometry is a rod-shaped geometry, said motor part and said handle part having housings with central longitudinal axes which extend toward each other and are offset in parallel.

6. An electrical tool with an adjustable housing geometry, comprising:
a motor part; and
a handle part, wherein the handle part comprises a power supply block, and wherein a detachable connection between the motor part and the handle part allows relative movement therebetween and wherein said detachable connection has a connection plane which is intersected by a central longitudinal axis of a housing of said motor part and which is intersected by a central longitudinal axis of a housing of said handle part.

7. An electrical tool as defined in claim 6, wherein said detachable connection is configured as a coupling.

8. An electrical tool as defined in claim 3, wherein said detachable connection configured as said coupling is formed as a bayonet coupling.

9. An electrical tool as defined in claim 6, wherein said connection has a connection surface which forms an angle of substantially 45° with central longitudinal axes of housings of said motor part and said handle part.

10. An electrical tool as defined in claim 6, wherein the housing geometry is an L shape geometry, said motor part and said handle part having housings with central longitudinal axes which form an angle of up to 120°.

11. An electrical tool as defined in claim 6, wherein said housing geometry is a rod-shaped housing geometry, said motor part and said handle part having housings with central longitudinal axes which form an angle of up to 30°.

12. An electrical tool as defined in claim 6, wherein a rotational axes of the housing geometry extends at an angle of 90° toward said connection plane.

13. An electrical tool as defined in claim 6, wherein said power supply block is a rechargeable block.

14. An electrical tool as defined in claim 6, wherein said adjustable housing geometry is in one configuration, an offset rod shape geometry, and, in another configuration, an L shape geometry.

15. An electrical tool as defined in claim 6, wherein said motor part and said handle part have housings with central longitudinal axes each intersecting a rotational axes of the housing geometry, with one intersection point located at a distance from a plane of said connection and in a region of said motor part, and another intersection point located at a distance from the connection plane and in a region of said handle part.

16. A tool system with an adjustable housing geometry, comprising:
a plurality of different motor parts; and
a handle part, wherein the handle part comprises a power supply block, and wherein a detachable connection between the handle part and any single one of said different motor parts forms a functional electrical tool unit and allows relative movement between the any single one motor part and the handle part.

17. An electrical tool with an adjustable housing geometry, comprising:
a motor part; and
a handle part, wherein the handle part comprises a power supply block, and wherein a detachable connection between the motor part and the handle part allows relative movement therebetween, wherein the housing geometry is a rod-shaped geometry, said motor part and said handle part having housings with central longitudinal axes which extend toward each other and are offset in parallel.

18. An electrical tool with an adjustable housing geometry, comprising:
a motor part; and
a handle part, wherein the handle part comprises a power supply block, and wherein a detachable connection between the motor part and the handle part allows relative movement therebetween, wherein the housing geometry is a rod-shaped geometry, said motor part and said handle part having housings with central longitudinal axes which extend toward each other and are offset in parallel, wherein said motor part has a housing with a central longitudinal axes which intersects a connection surface of said connection at an angle which is different from an angle of intersection of a central longitudinal axes of a housing of said handle part with said connection surface.

19. An electrical tool with an adjustable housing geometry, comprising;
a motor part; and
a handle part, wherein the handle part comprises a power supply block, and wherein a detachable connection between the motor part and the handle part allows relative movement therebetween,
wherein said connection has a connection surface which forms an angle of substantially 45° with central longitudinal axes of housings of said motor part and said handle part.

20. An electrical tool as defined in claim 19, wherein said housing geometry is an offset rod shape geometry.

* * * * *